Patented Apr. 6, 1926.

1,579,957

UNITED STATES PATENT OFFICE.

CHRISTIAN SCHNEIDER, OF NEUROSSEN, NEAR MERSEBURG, GERMANY, ASSIGNOR TO BADISCHE ANILIN- & SODA-FABRIK, OF LUDWIGSHAFEN-ON-THE-RHINE, GERMANY, A CORPORATION OF GERMANY.

TREATING TAR WATER.

No Drawing.    Application filed November 7, 1925. Serial No. 67,696.

*To all whom it may concern:*

Be it known that I, CHRISTIAN SCHNEIDER, citizen of the German Empire, residing at Neurossen, near Merseburg, Germany, have invented new and useful Improvements in Treating Tar Water, of which the following is a specification.

Tar water obtained by the gasification or distillation of bituminous fuels and cooling the gases by injecting water, is an undesirable by-product and its removal hitherto caused great difficulties. On account of the phenolic bodies contained in the tar water it cannot be drained to rivers especially when the latter carry little water. It has therefore been proposed to purify the tar water before introducing it into rivers in order to remove the phenolic bodies or render them harmless. However most of these methods are troublesome and expensive.

It is also known to evaporate tar water by means of air or hot combustion gases. For this purpose, cooling plants of the usual type with natural draught or towers supplied with suitable filling bodies, for example Raschig rings, coke and the like, in which the hot tar water is treated with an air blast, are used, in which cases little or no waste water is obtained and the cooled water is continuously employed for cooling gases in a circular course. However, the great disadvantage is observed that the phenolic bodies are transformed into resinous products by which the evaporators are soon choked and which can only be removed with difficulty.

I have now found that this disadvantage of the last-named methods can be met with by adding caustic alkali to the tar water before treating it with air, preferably by adding so much of caustic alkali as corresponds to the content of phenolic bodies. While in this case, the phenolic bodies are also oxidized in the cooling plant, they are not transformed into resinous sludge. When again using the water for cooling distillation gases, it comes into contact with the carbon dioxid contained in the latter which decomposes the caustic alkali or the alkali metal phenolate still present to alkali metal carbonate or bicarbonate and free phenols which decomposition make the addition of fresh caustic alkali necessary. This, however, may be avoided by adding to the tar water, prior to its introduction into the cooling water, slaked lime whereby the alkali metal carbonate is again transformed into caustic alkali. This manner of working has a further advantage in that by the precipitation of calcium carbonate part of the impurities as for example tar and dust are likewise precipitated and can be removed by allowing the sludge to settle. Lime is added in such quantities as to form sufficient alkali metal hydroxid. The alkali remains in the circular course and is alternately converted into carbonate and hydroxid. Alkali metal carbonate may also be added initially together with lime instead of caustic alkali.

If the gases to be cooled contain sulfuretted hydrogen, part of this would dissolve in the alkaline cooling water which dissolved part by itself and by the formation of oxidation products would cause a certain loss of alkali. These losses must either be made up or avoided by removing the sulfuretted hydrogen from the distillation gas before cooling it.

Preferably, prior to the addition of caustic alkali, or lime, as the case may be, the bulk of the tar contained in the cooling water should be allowed to separate and be removed, whereby the consumption of alkali or lime is reduced to a minimum.

I claim:

1. The method of treating tar water consisting in adding to hot tar water an alkali metal hydroxid, exposing the liquor to air and utilizing the liquor again for cooling gases obtained by the distillation of bituminous fuel.

2. The method of treating tar water consisting in adding to hot tar water alkali metal carbonate and caustic lime to produce a slight caustic reaction, exposing the hot liquor to a stream of gas and utilizing the liquor again for cooling tarry gases.

3. The method of treating tar water consisting in adding to hot tar water an alkali metal carbonate and lime, exposing the hot liquor to a stream of gas, removing calcium carbonate and utilizing the liquor again for cooling tarry gases, adding lime alone in each following cycle.

4. The method of treating tar water consisting in adding to hot tar water alkali metal carbonate and caustic lime to produce a slight caustic reaction, exposing the hot liquor to a stream of gas and utilizing the liquor again for cooling tarry gases free from sulfuretted hydrogen.

5. The method of treating tar water consisting in adding to hot tar water alkali metal carbonate and caustic lime to produce a slight caustic reaction, exposing the hot liquor to a stream of gas, utilizing the liquor again for cooling tarry gases, separating suspended tar from the liquor and repeating the operations.

6. The method of treating tar water consisting in separating suspended tar from the liquor and adding to the hot tar water a caustic alkali, cooling the hot liquor by means of a stream of gas, removing calcium carbonate, utilizing the liquor again for cooling tarry gases and repeating the operations, causticizing with lime in each subsequent cycle.

In testimony whereof I have hereunto set my hand.

CHRISTIAN SCHNEIDER.